United States Patent [19]

Katayama et al.

[11] Patent Number: 5,076,666
[45] Date of Patent: Dec. 31, 1991

[54] ACTIVE MATRIX DISPLAY APPARATUS WITH DRAIN ELECTRODE EXTENSIONS

[75] Inventors: Mikio Katayama, Ikoma; Hiroaki Kato, Nara; Kiyoshi Nakazawa, Fujiidera; Hidenori Negoto, Ikoma; Yuzuru Kanemori, Tenri; Motokazu Inui, Kawachinagano; Akihiko Imaya; Takayoshi Nagayasu, both of Nara, all of Japan

[73] Assignee: Sharp Kabushiki Kaisha, Japan

[21] Appl. No.: 444,732

[22] Filed: Dec. 1, 1989

[30] Foreign Application Priority Data

Dec. 6, 1988 [JP] Japan ............... 63-308231
Mar. 28, 1989 [JP] Japan ............... 1-77828
May 10, 1989 [JP] Japan ............... 1-116694

[51] Int. Cl.$^5$ .............................. G02F 1/13
[52] U.S. Cl. .......................... 359/59; 357/4; 357/23.7; 359/87
[58] Field of Search ........... 350/332, 333, 334, 346; 357/2, 4, 23.7

[56] References Cited

U.S. PATENT DOCUMENTS

| 4,639,087 | 1/1987 | Cannella | 350/336 |
| 4,907,861 | 3/1990 | Muto | 350/334 |
| 4,930,874 | 6/1990 | Mitsumune et al. | 350/336 |
| 4,949,141 | 8/1990 | Busta | 350/334 |

FOREIGN PATENT DOCUMENTS

| 200138 | 12/1986 | European Pat. Off. |  |
| 62-22455 | 1/1987 | Japan. |  |
| 0033530 | 2/1989 | Japan | 350/336 |
| 0050028 | 2/1989 | Japan | 350/336 |

OTHER PUBLICATIONS

Patent Abstracts of Japan, vol. 11, No. 195 (E-518), 23 Jun. 1987.

Primary Examiner—William Mintel
Assistant Examiner—Tan Ho
Attorney, Agent, or Firm—Irell & Manella

[57] ABSTRACT

An active matrix display apparatus comprising a pair of substrates, at least one of which is translucent, a display medium charged between the substrates and modulated of its optical characteristics in response to applied voltage, picture element electrodes disposed in a matrix at the inner surface of either one of the pair of substrates, switching elements electrically connected to the picture element electrodes respectively, and spare switching elements disposed close to the picture element electrodes in a non-conductive state respectively, the extension end of the spare switching element and one end of the picture element electrode are disposed on a metal piece so as to sandwich an insulating layer therebetween, whereby a picture element defect caused by a malfunction of switching elements can be readily corrected.

11 Claims, 9 Drawing Sheets

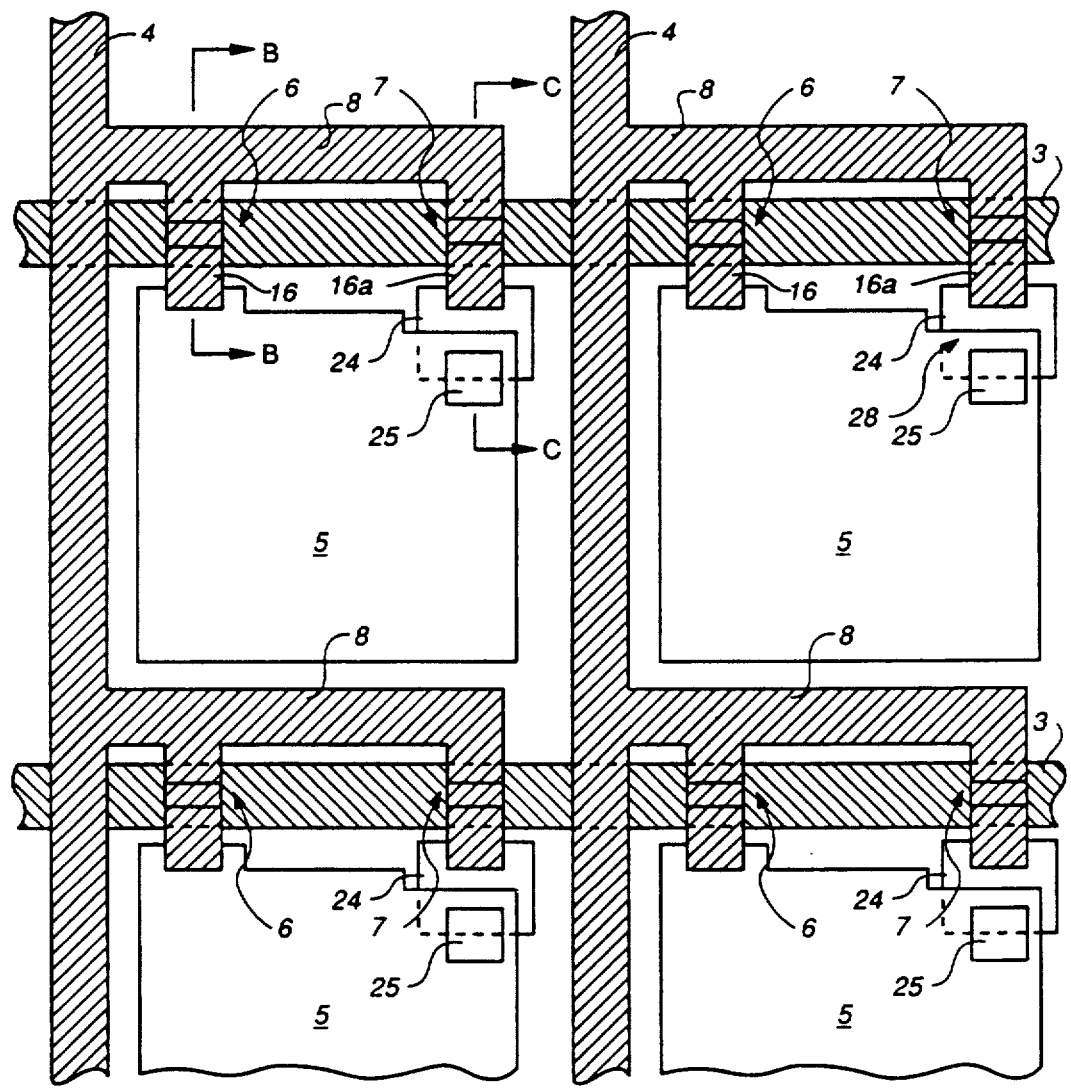
FIG._1A

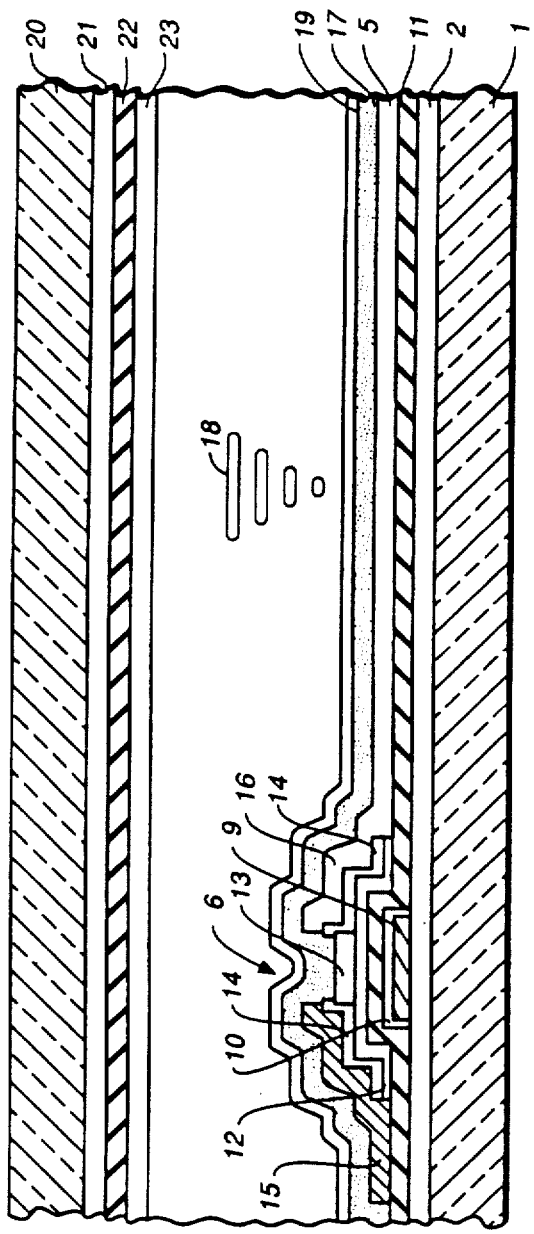
FIG._1B
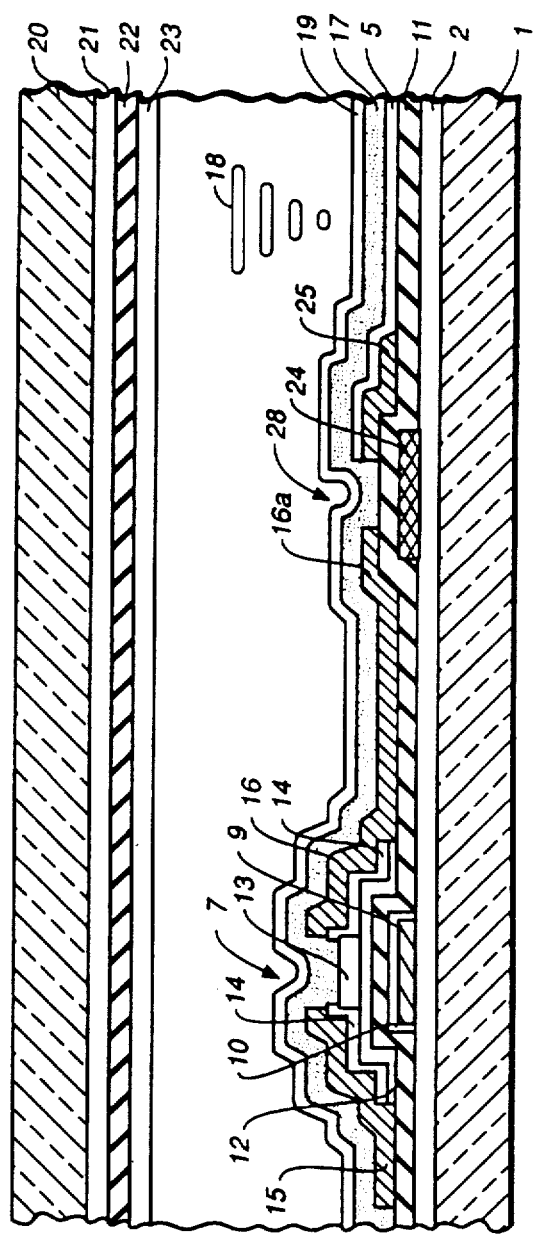
FIG._1C

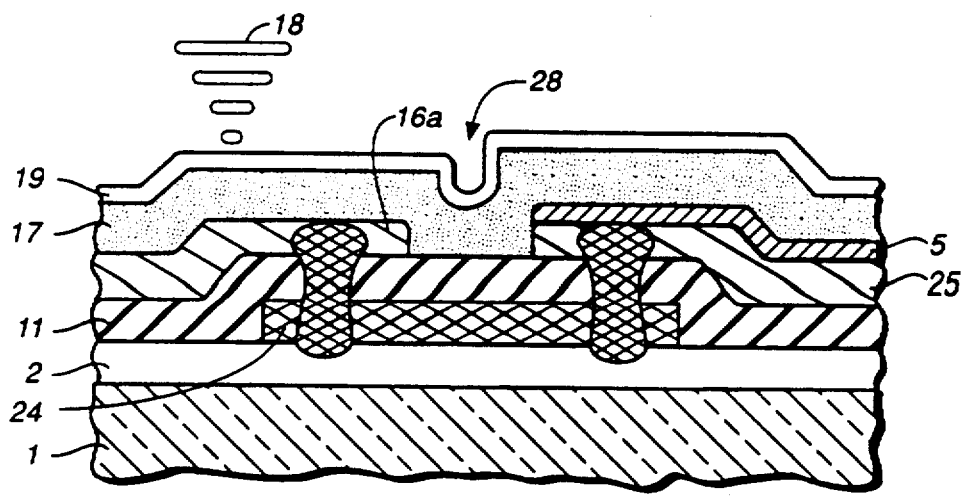
FIG._2
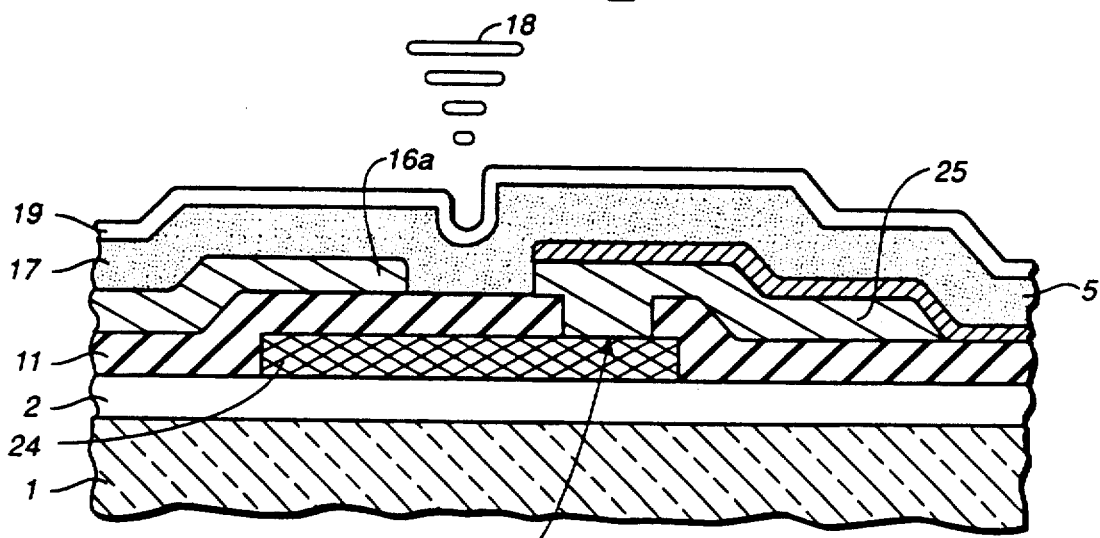
FIG._3
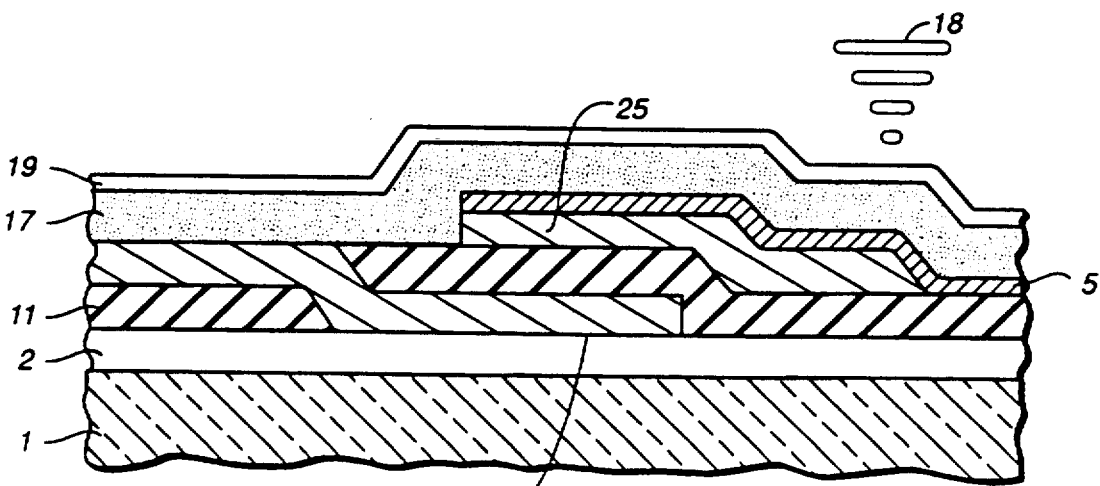
FIG._4

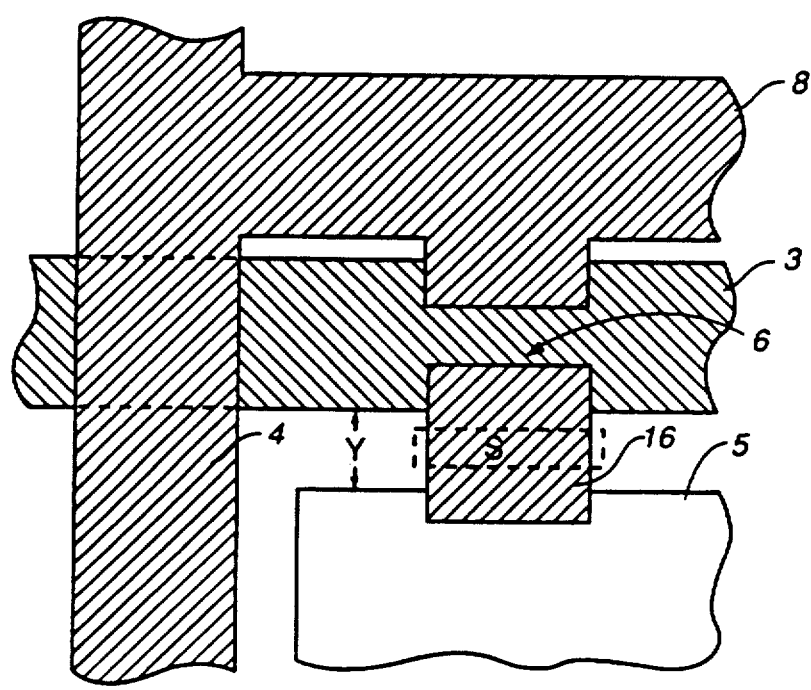
FIG._5
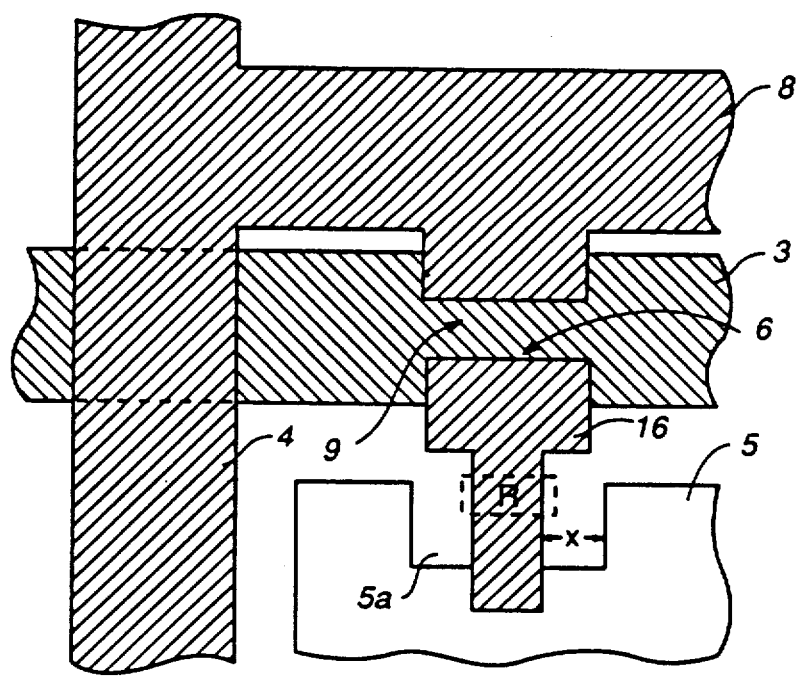
FIG._7

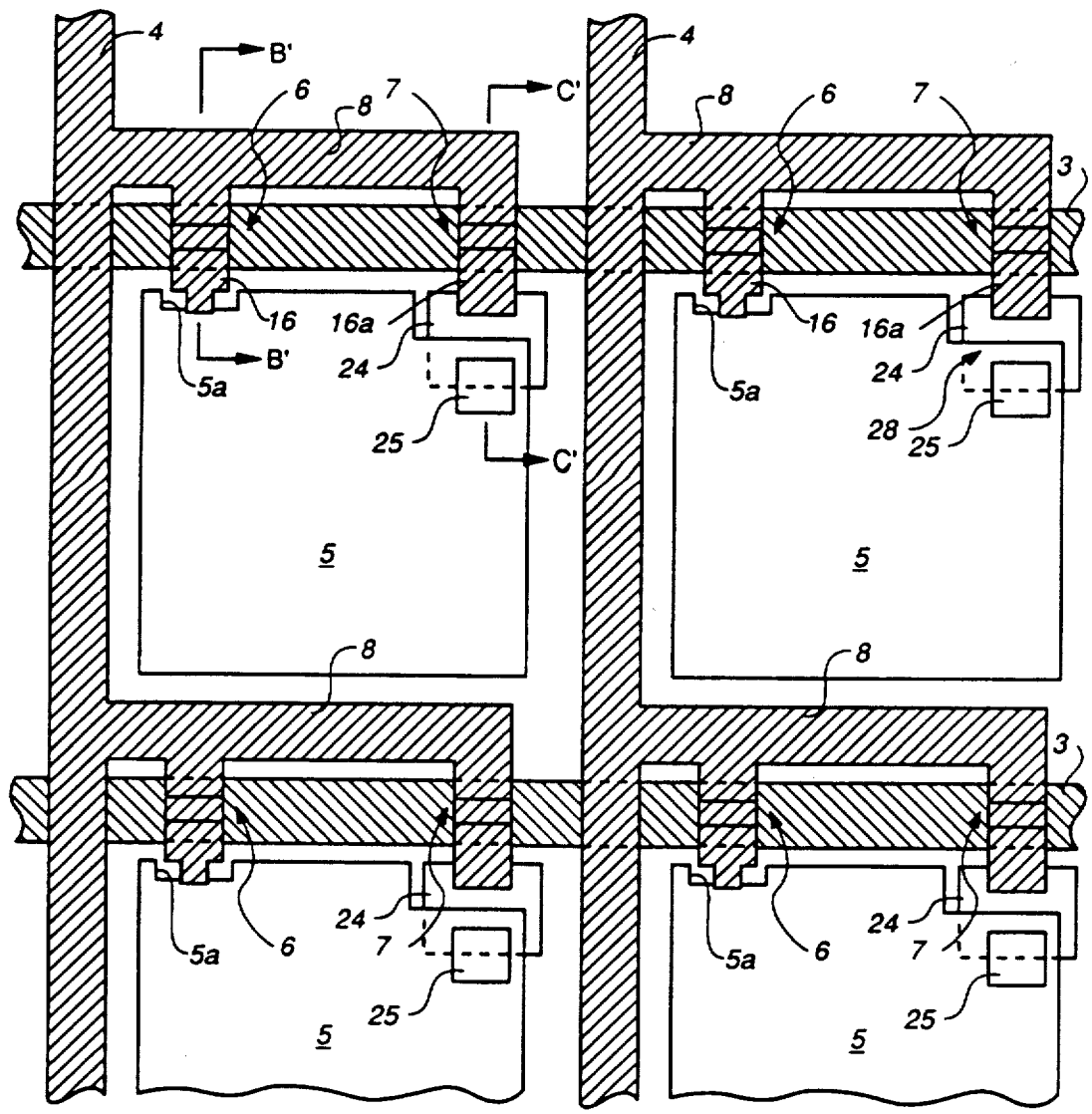
FIG._6

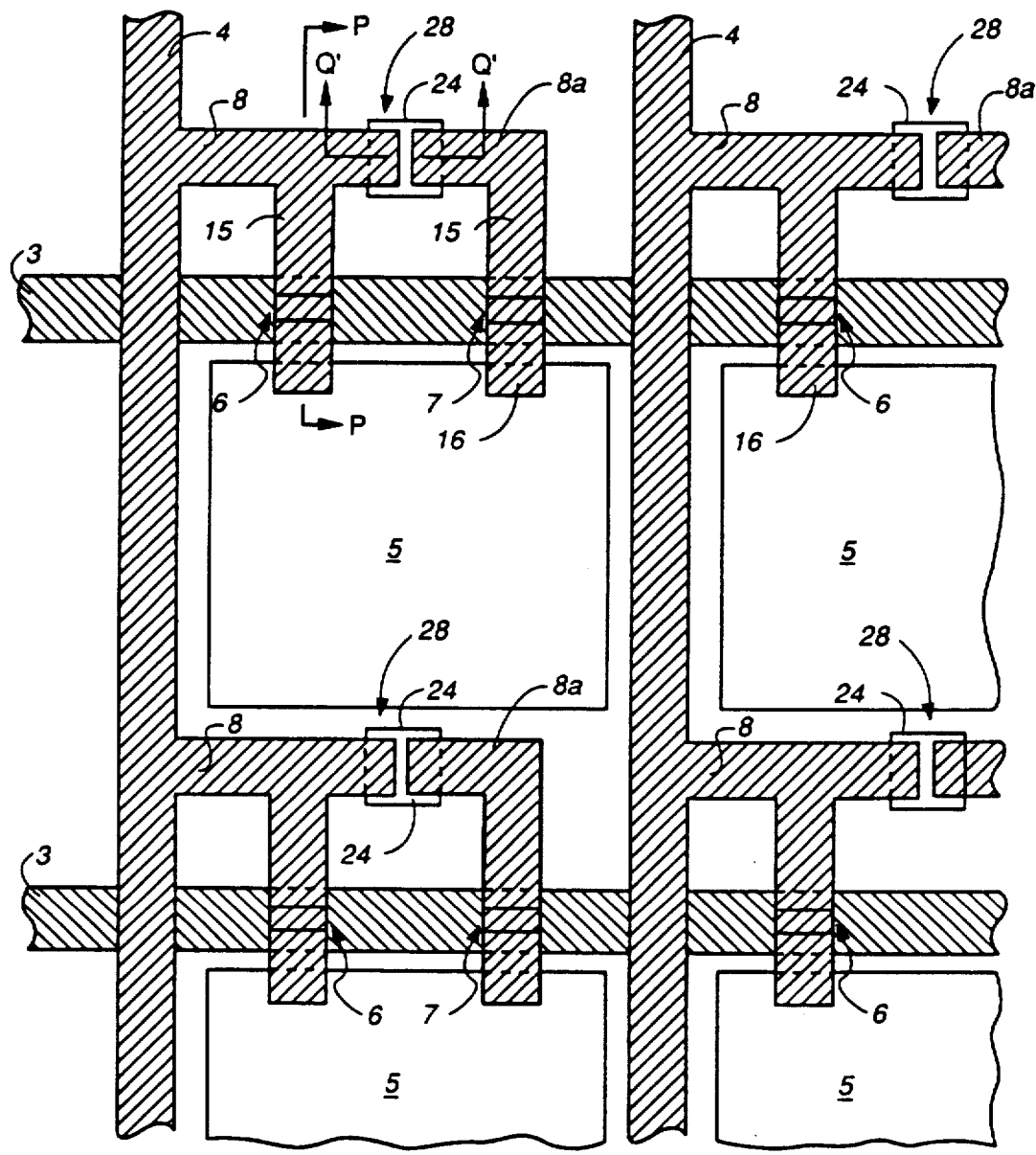
FIG._8

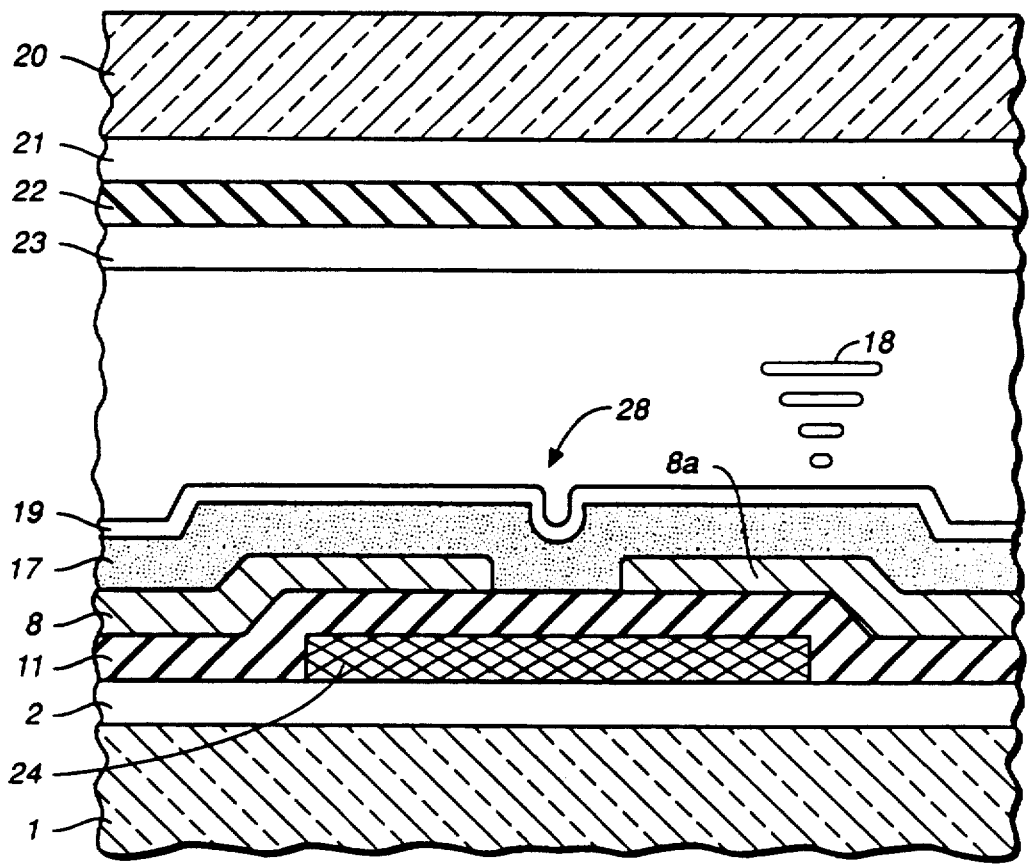
FIG._9
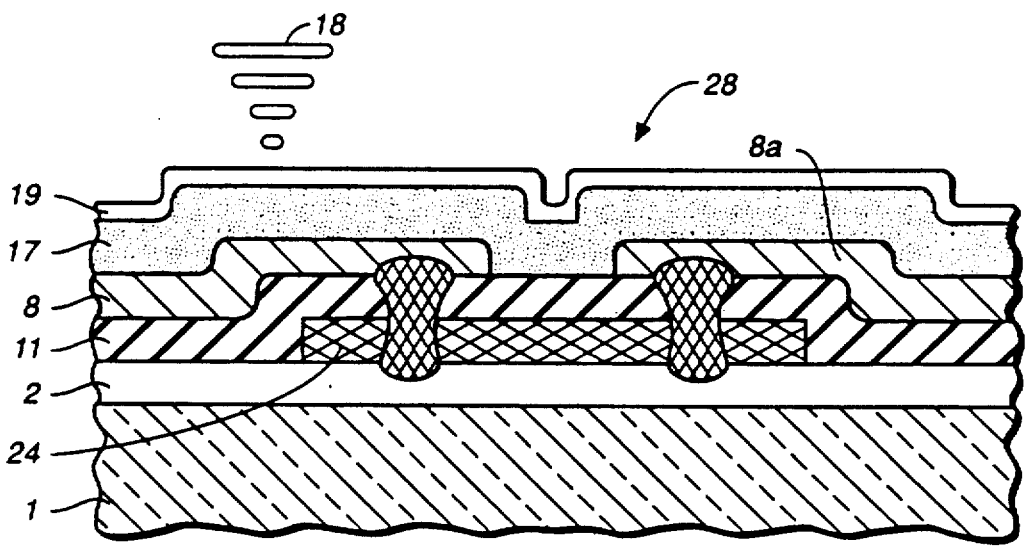
FIG._10

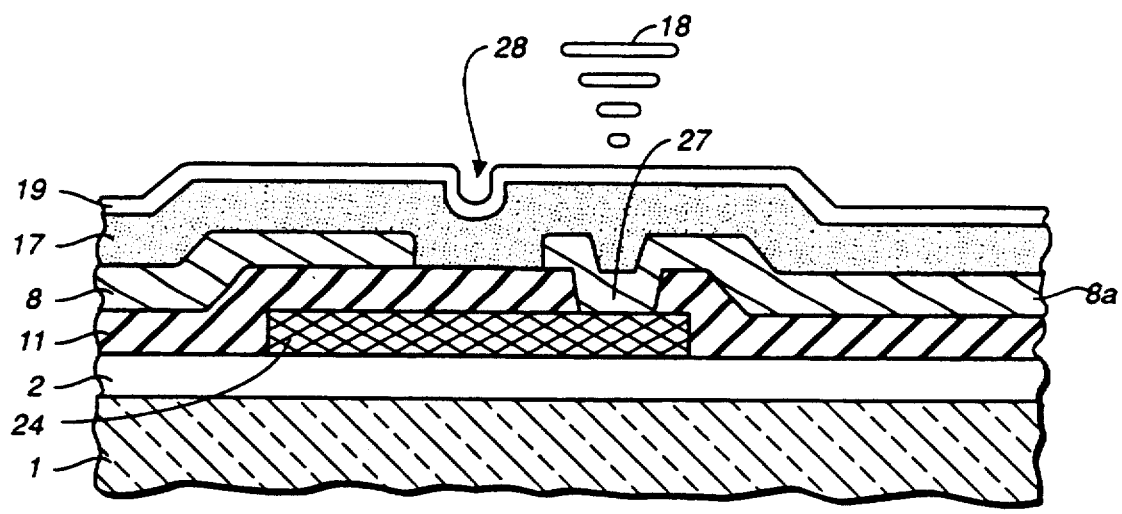
FIG._11
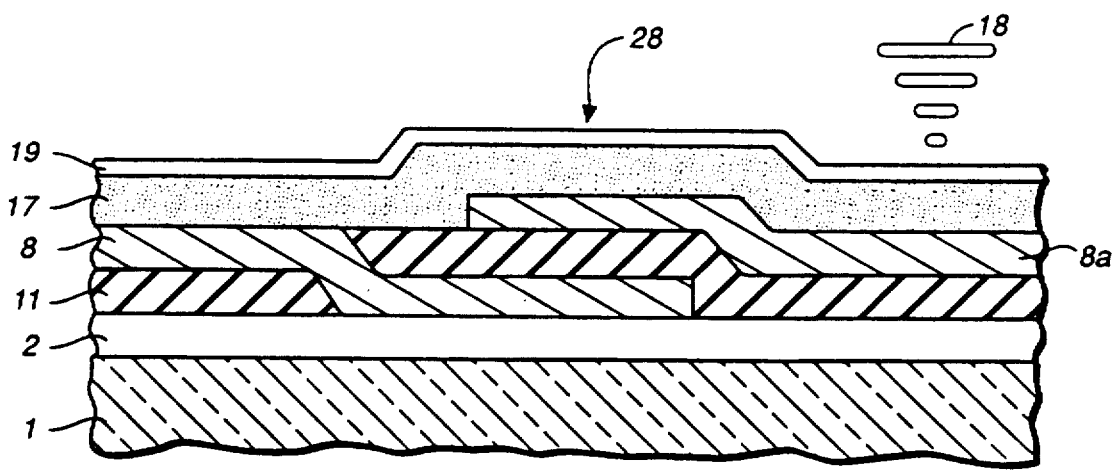
FIG._12

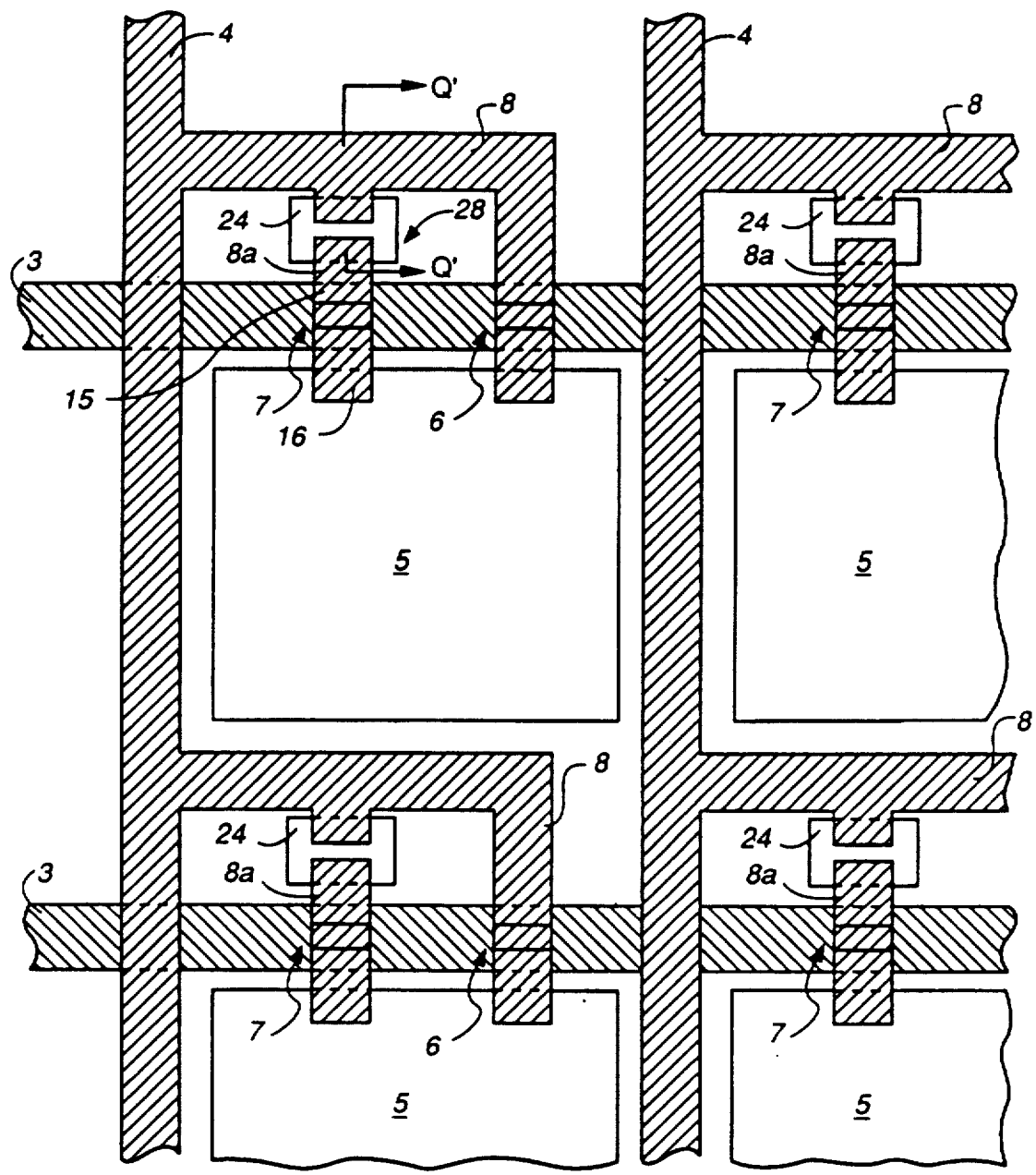
FIG._13

ACTIVE MATRIX DISPLAY APPARATUS WITH DRAIN ELECTRODE EXTENSIONS

BACKGROUND OF THE INVENTION

1. Field of the invention:

The present invention relates to a display apparatus for a performing display by applying a drive signal to displaying picture element electrodes by means of switching elements. More particularly, it relates to an active matrix drive mode display apparatus which disposes the picture element electrodes in a matrix so as to perform high density display.

2. Description of the prior art:

A liquid crystal display apparatus, an electro-luminance display apparatus and a plasma display apparatus have hitherto been selected to display picture elements disposed in a matrix form to form a display pattern on a picture plane. A method for selecting display picture elements includes an active matrix driving method which disposes individually independent picture element electrodes and connects the switching element to the respective picture element electrodes for display drive. This method enables displays in high contrast and is put in practical use for liquid crystal television, word processors, terminal display units for computers, or the like. The switching element for selectively driving the picture element electrodes is either a thin film transistor (TFT) element, a metal-insulator-metal (MIM) element, a MOS transistor element, a diode, a varistor or the like. Voltage applied between the picture element electrodes and an electrode apposite thereto is switched to optically modulate a display medium, such as liquid crystal, EL light emission layer or plasma luminosity, the optical modulation being visually recognized as the display pattern.

When the switching elements are connected to the picture element electrodes for carrying out the high density display, it is required to dispose a great many picture element electrodes and switching elements. The switching element, however, may be a malfunctioning element at the time when it is packaged on a substrate, and the picture element electrode connected to such a poor element leads to a picture element defect that dose not contribute to the display.

The technique for restoring the picture element defect has been disclosed in, for example, Japanese Laid-Open Patent Publication No. 61-153619, in which a plurality of switching elements are provided per one picture element electrode, and only one of these switching elements is connected to the picture element electrode. The switching element connected to the picture element electrode, when it is poor, is cut off from the picture element electrode by a laser trimmer, an ultrasonic cutter or the like, and another switching element is connected to the picture element electrode. In this case, the switching element and picture element electrode are connected therebetween by bonding a minute conductor with a dispenser or the like, or by coating Au, Al or the like at a predetermined location on the substrate. Furthermore, Japanese Laid-Open Patent Publications No. 61-56382 and No. 59-101693 disclose the technique for irradiating the laser light to melt metal so as to electrically connect between the metal layers.

The above-mentioned conventional techniques for restoring the defect, after detection thereof, irradiate the laser light to evaporate and redeposite metal or locally melt the metal, thereby performing an electrical connection. In other words, these techniques must be used in the manufacturing process for active matrix substrates prior to the assembly of the display panel. The reason for this is that, after completion of the display panel, part of the metal evaporated or melted by irradiation of laser light is mixed into the display medium such as liquid crystal, which is interposed between the picture element electrode and the opposite electrode thereto, and thereby remarkably deteriorates the optical characteristics of the display medium. Accordingly, both the above-mentioned conventional methods for restoring picture element defects are applied to an active matrix substrate manufacturing process prior to the display panel assembly, in other words, before the display medium is charged.

However, it is very difficult to detect the picture element defect in the process of manufacturing the active matrix substrate. Especially, for a large-sized panel of picture elements of one hundred thousand to five hundred thousands or more, measurement equipment of extremely high accuracy must be used to detect the electrical characteristics of all the picture element electrodes so as to find a poor switching element. As a result, the detection process becomes complicated, the mass productivity is impeded, and the display apparatus has a high production cost. Accordingly, the fact is that the aforesaid restoring techniques cannot be used for the large-sized display panel with a large number of picture elements.

SUMMARY OF THE INVENTION

The active matrix display apparatus of this invention, which overcomes the above-discussed and numerous other disadvantages and deficiencies of the prior art, comprises a pair of substrates, at least one of which is translucent, a display medium charged between said substrates and modulated of its optical characteristics in response to applied voltage, picture element electrodes disposed in a matrix at the inner surface of either one of said pair of substrates, switching elements electrically connected to said picture element electrodes respectively, and spare switching elements disposed close to said picture element electrodes in a non-conductive state respectively, wherein an extension end of each of said spare switching elements and each of said picture element electrodes are opposite each other in a non-conductive state so as to form a connection that is coated by an insulating protective coat and isolated from said display medium.

In a preferred embodiment, the connection is formed so that the extension end of said spare switching element and one end of said picture element electrode are disposed on a metal piece so as to sandwich an insulating layer therebetween.

In a preferred embodiment, the connection is formed so that the extension end of said spare switching element and one end of said picture element electrode are disposed so as to sandwich an insulating layer therebetween.

In a preferred embodiment, a through hole is formed in a portion of said insulating film on which either the extension end of said spare switching element or the end of said picture element electrode is disposed.

In a preferred embodiment, a cutout is formed in the vicinity of part of said picture element electrode to be connected with said switching element.

Alternatively, the active matrix display apparatus of this invention comprises a pair of substrates, at least one of which is translucent, a display medium charged between said substrates and modulated of its optical characteristics in response to applied voltage, picture element electrodes disposed in a matrix at the inner surface of either one of said pair of substrates, switching elements and spare switching elements electrically connected to said picture element electrodes respectively, and signal lines connected to said switching elements respectively, wherein a connection at which an extension end of a signal input terminal at each of said spare switching elements and a branch wire branched from each of said signal lines are opposite each other so as to form a connection that is coated by a protective coat and isolated from said display medium.

Thus, the invention described herein makes possible the objectives of (1) providing an active matrix display apparatus which is capable of correcting the picture element defect caused by a malfunction of switching elements, when the display apparatus is in a state that the position generating the picture element defect is easily specified; and (2) providing an active matrix display apparatus which can correct the above-mentioned picture element defect without a reduction of the opening ratio thereof.

BRIEF DESCRIPTION OF THE DRAWINGS

This invention may be better understood and its numerous objects and advantages will become apparent to those skilled in the art by reference to the accompanying drawings as follows:

FIG. 1A is a plan view showing an active matrix substrate used for an active matrix display apparatus of this invention.

FIGS. 1B and 1C are sectional views showing the active matrix display apparatus with the active matrix substrate of FIG. 1A, taken on lines B—B and C—C of FIG. 1A, respectively.

FIG. 2 is a sectional view showing a state that the picture element electrode and an extension end of the drain electrode are electrically connected to each other by the irradiation with laser light.

FIGS. 3 and 4, respectively, are sectional views showing other examples of a state that the picture element electrode and the extension end of the drain electrode are positioned in a non-conductive condition.

FIG. 5 is a plan view showing an enlarged portion in the vicinity of the TFT 6 shown in FIG. 1A.

FIG. 6 is a plan view showing an active matrix substrate on which picture element electrodes having a cutout each therein are disposed, said substrate being used in another display apparatus of this invention.

FIG. 7 is a plan view showing an enlarged portion in the vicinity of the TFT 6 shown in FIG. 6.

FIG. 8 is a plan view showing an active matrix substrate used in another display apparatus of this invention.

FIG. 9 is a sectional view showing the display apparatus with the active matrix substrate of FIG. 8, taken on lines Q—Q of FIG. 8.

FIG. 10 is a sectional view showing a connection at which the picture element electrode and an extension end of the drain electrode are electrically connected by irradiation with laser light.

FIGS. 11 and 12, respectively, are sectional views showing other connections between the picture element electrode and the extension end of the drain electrode.

FIG. 13 is a plan view showing an active matrix substrate used in another display apparatus of this invention.

DESCRIPTION OF THE PREFERRED EMBODIMENTS

EXAMPLE 1

FIG. 1A is a plan view of active matrix substrates used for an active matrix display apparatus of the invention, which is a liquid crystal display apparatus of transmission type. This invention is, of course, applicable to a liquid crystal display apparatus of the reflection type. FIGS. 1B and 1C are sectional views of the active matrix display apparatus in FIG. 1A, taken on the lines B—B and C—C therein, in which a base coating film 2 of $Ta_2O_5$, $Al_2O_5$, SiNx or the like with 3000 Å to 9000 Å in thickness is formed on a glass substrate 1. The base coating film 2 is not inevitably provided. On the base coating film 2 are disposed in a lattice-like shape gate bus wirings 3 for supplying a scanning signal and source bus wirings 4 for supplying a data signal. The gate bus wirings 3 are generally made of a single layer or multilayers of metal, such as Ta, Al, Ti, Ni or Mo, but the present embodiment uses Ta. The source bus wirings 4 are made of the same metal as the gate bus wirings 3, but the present embodiment uses Ti. At the intersection of the gate bus wirings 3 and the source bus wirings 4 is interposed a base insulating film 11 that is discussed below. At each rectangular area surrounded by the gate bus wirings 3 and source wirings 4 is disposed a corresponding picture element electrode 5 that is composed of a transparent conductive film (ITO), resulting in picture elements in a matrix. A thin film transistor TFT 6 is disposed in the vicinity of one corner of each picture element electrode 5, the TFT 6 and picture element electrode 5 being electrically connected by a drain electrode 16. A spare TFT 7 is disposed in the vicinity of another corner of each picture element electrode 5. The spare TFT 7 and picture element electrode 5 being not-conductively opposite each other so as to form a connection 28. The TFTs 6 and spare TFTs 7 are juxtaposed on the gate bus wiring 3 and connected with the source bus wiring 4 by means of a branch wiring 8 respectively.

Next, explanation will be given on sectional construction in the vicinity of TFT 6 by reference to FIG. 1B. On a gate electrode 9 of Ta formed as part of the gate bus wiring 3 is formed a gate insulating film 10 composed of $Ta_2O_5$ obtained by anodic-oxidizing the surface of gate electrode 9. On the gate insulating film 10 are sequentially laminated a base insulating film 11, an intrinsic semiconductor layer 12, a semiconductor protective coat 13 and an n-type semiconductor layer 14. The base insulating film 11 functions also as a gate insulating film and is composed of SiNx (for example, $Si_3N_4$). The intrinsic semiconductor layer 12 is composed of amorphous silicon (a-Si). The semiconductor protective coat 13 is provided in order to protect the upper surface of intrinsic semiconductor layer 12 and composed of SiNx. The n-type semiconductor layer 14 is provided for obtaining ohmic contact with the source electrode and drain electrode, and composed of a-Si. On the n-type semiconductor layer 14 are formed a source electrode 15 connected to the branch wiring 8 and a drain electrode 16 connected with the picture element electrode 5, the source electrode 15 and drain electrode 16 being composed of Ti, Ni, Al or the like.

The picture element electrode 5 connected with the end of drain electrode 16 is patterned on the base insulating film 11. A proper thickness of base insulating film 11 is about 1500 Å to 6000 Å, but in the present embodiment it is set to be 2000 Å to 3500 Å. A protective coat 17 of SiNx is formed on substantially the entire surface to cover the TFT 6 and picture element electrode 5, and an orientation layer 19 for regulating orientation of the liquid crystal molecule of a liquid crystal layer 18 is deposited on the protective coat 17, the orientation layer 19 being composed of $SiO_2$, polyimide resins or the like. The thickness of the protective coat 17 is properly 2000 Å to 10000 Å, but in the present embodiment, it is set to be about 5000 Å. In addition, the base insulating film 11 and protective coat 17 may, other than SiNx, use oxide or nitride, such as SiOx, $Ta_2O_5$ or $Al_2O_3$. In addition, the protective coat 17 is not formed on the entire surface of the substrate, but may be window-like-shaped by cutting out the central portion of picture element electrode 5.

A color filter layer 21, an opposite electrode 22 opposite to the picture element electrode 5, and an orientation layer 23 are superposed on the inner surface of another glass substrate 20 opposite to the glass substrate 1 on which the picture element electrode 5 is formed. Around the color filter layer 21 is provided a black matrix (not shown) as desired.

Between the pair of glass substrates 1 and 20 is charged a twistingly orientating twisted nematic liquid crystal layer 18 as the display medium, so that the liquid crystal molecules are changed in orientation in response to voltage applied between the picture element electrode 5 and the opposite electrode 22, thereby performing optical modulation.

Next, explanation will be given on construction in the spare TFT 7 and the connection 28, which is the same in construction as the aforesaid TFT 6. As shown in FIG. 1C, a joint metal layer 24 is formed in an island-like shape and on the base coat film 2 at a predetermined distance apart from the gate electrode 9, and composed of Ti, Ni, Al or Ta the same as the gate electrode 9, and can be formed in pattern simultaneously with the formation of the gate electrode 9. On the joint metal layer 24 is deposited the aforesaid base insulating film 11 and an extension end 16a of a drain electrode is formed on the base insulating film 11 under which the spare TFT 7 is disposed. An end of the picture element electrode 5 is laminated together with a metal piece 25 on the base insulating film 11 that is positioned on the joint metal layer 24. Accordingly, the extension end 16a is separate from the picture element electrode 5 to be kept in not-conductive condition. The metal piece 25 is composed of Ti, Ni, Al or Ta. The extension end 16a of drain electrode at the spare TFT 7 and an end of the picture element electrode on the metal piece 25 are completely covered by the protective coat 17. Also, the base insulating film 11 positioned between the joint metal layer 24 and the extension end 16a of drain electrode and metal piece 25 functions as an interlayer insulating member between the vertical metals and is properly to be of about 1000 Å to 7000 Å in thickness. The base insulating film 11 at the present embodiment serves also as the gate insulating film of TFT, thereby being set to be 2000 Å through 3500 Å as abovementioned. Also, the protective coat 17 serves to electrically connect the extension end 16a of drain electrode and metal piece 25 in a state of being isolated from liquid crystal layers 18 of display medium, and is proper to be a 1500 Å to 15000 Å thick, but the present embodiment uses the TFT protective coat, whereby the protective coat 17 is set to be about 5000 Å in thickness.

The entire gate bus wirings 3 at the liquid crystal apparatus of the above-mentioned construction are turned on, drive voltage is applied from the entire source bus wirings 4 to the entire picture element electrodes 5 through TFTs 6, and the display apparatus is driven as a whole. In such a state of display apparatus, the TFT 6, when defective, is easy to visually detect as a defect in the picture element. At the detected defective picture element part, as shown by the arrows 26 in FIG. 2, the energy, such as laser light, infrared light, electron beam or the like, is irradiated from the outside thereof to the joint metal layer 24 through the lower glass substrate 1 or the upper glass substrate 20, in which the present invention uses an yttrium-aluminum-garnet (YAG) laser. When the laser light is irradiated, the base insulating film 11 is subjected to dielectric breakdown and the extension end 16a and joint metal layer 24 are melted to each other, thereby causing a conductive condition. Similarly, the metal piece 25 at the picture element electrode 5 side and the joint metal layer 24, when irradiated therebetween by the laser light, are melted and contact with each other so as to be put in a conductive condition. Thus, the spare TFT 7 and picture element electrode 5 are electrically connected. The protective coat 17 is formed above the joint metal layer 24, extension end 16a and metal piece 25, so that there is no fear that the melted metal mixes into the liquid crystal layer 18 of a display medium. Since the protective coat 17 is a transparent insulator and transmits therethrough the laser light, the laser light is absorbed to metallic material to be instantaneously heated and melted. Accordingly, the laser light is irradiated to melt and mix the metal materials and the interlayer insulating films sandwiched therebetween are melted and mixed with each other, but the protective coat 17 is not at all broken-down. Also, part of the liquid crystal layer 18 irradiated by the laser light becomes cloudy, but it is confirmed that such a cloudy part is soon restored to the original orientation.

The spare TFT 7 and picture element electrode 5 may, other than the above-mentioned construction, be constructed as shown in FIG. 3 or 4. In FIG. 3, a through hole 27 is previously provided at the base insulating film 11, and connects the joint metal layer 24 with the metal piece 25, whereby the picture element defect caused by malfunction of TFT 6 can be corrected by electrically connecting only the extension end 16a of drain electrode at the spare TFT 7 with the joint metal layer 24 through the optical energy. In the construction in FIG. 4, the joint metal layer 24 is not provided, but the extension end 16a of drain electrode at the spare TFT 7 is disposed just below the metal piece 25 so as to sandwich the base insulating film 11 therebetween, whereby the irradiation of optical energy melts the extension end 16a of drain electrode and metal piece 25 to be directly connected with each other. It is apparent in FIGS. 3 and 4 that the extension end 16a of drain electrode, metal piece 25 and picture element electrode 5 may be constructed in relation to being vertically reverse. Furthermore, it is required for enabling the irradiation of laser light to use a member (of glass or plastic) having at least one translucent substrate.

As seen from the above, the embodiment of the active matrix display apparatus can reliably correct the defect in a picture element in the state where the picture element defective portion at the display apparatus can visually be specified with ease. Therefore, an inspection process and a restoration process become easy to ensure mass productivity.

In a case where the TFT 6 causes an insulation failure, it is required that, after the spare TFT 7 is connected with the picture element electrode 5, the TFT 6 must be disconnected therefrom by cutting the drain electrode 16 by irradiation of the laser light. FIG. 5 is an enlarged view of connection of TFT 6 and picture element electrode 5 in FIG. 1A, the laser light being irradiated to an area designated by S in FIG. 5, and the drain electrode 16 being cut.

When such the laser light is irradiated, when a distance Y between the picture element electrode 5 and the gate bus wiring 3 is smaller, the melted and diffused metal adheres to the picture element electrode 5 or gate bus wiring 3, may result in the drain electrode 16 not being electrically cut, in which the picture element defect cannot be corrected. In order to avoid such a condition, the distance Y between the picture element electrode 5 and the gate bus wiring 3 is considered to be larger. However, when the distance Y is increased, the opening ratio of the active matrix substrate may lower to darken the entire display apparatus.

EXAMPLE 2

FIG. 6 shows an active matrix substrate used for another active matrix display apparatus of the invention. The present embodiment can reliably disconnect the picture element electrode 5 from the TFT 6 and the opening ratio does not lower, and is similar in construction to that of FIG. 1A, but different therefrom in the portion for connecting the drain electrode 16 at the TFT 6 and the picture element electrode 5. The structural views taken on the lines B'—B' and C'—C' in FIG. 6 are the same as those in FIGS. 1B and 1C.

FIG. 7 shows an enlarged portion through which the drain electrode 16 and the picture element electrode 5 in FIG. 6 are connected, in which the drain electrode 16 is extended from above the gate electrode 9 toward the picture element electrode 5 and smaller in width at part apart from the gate electrode 9. A rectangular cutout 5a is provided at a portion of the picture element electrode 5 close to the drain electrode 16. The narrow portion at the drain electrode 16 is connected at the foremost side of the cutout 5a from TFT 6 with the picture element electrode 5.

Also, in the present embodiment, when TFT 6 is in failure, the spare TFT 7 is connected to the picture element electrode in the same manner as that of Example 1. When TFT 6 must be disconnected from the picture element electrode 5 by an insulating failure of TFT 6, the laser light is irradiated to the drain electrode 16 of TFT 6 and the drain electrode 16 is cut off. Since the present embodiment of the display apparatus has the drain electrode 16 and picture element electrode 5 of configuration shown in FIG. 7, the laser light is irradiated onto the part R shown in FIG. 7 to enable the TFT 6 to be easily cut off from the picture element electrode 5. Also, a distance X (FIG. 7) between the picture element electrode 5 and the drain electrode 16 is made 5 μm or more, whereby it is confirmed that the irradiation of laser light can completely disconnect the drain electrode 16 from the picture element electrode 5.

Thus, the present embodiment of the active matrix display apparatus can reliably correct the picture element defect in the state of display apparatus where the defective portion of picture element can easily visually be specified, thereby facilitating the inspection process and restoration process so as to ensure the mass productivity. Moreover, there is no fear that the opening ratio will be lower.

EXAMPLE 3

FIG. 8 shows an active matrix substrate used for another modified embodiment of the display apparatus of the invention, which has a construction similar to that of the FIG. 1A embodiment, but different therefrom in that a drain electrode 16 at each spare TFT 7 is electrically connected with a picture element electrode 5 and a connection 28 is provided between each spare TFT 7 and each source bus wiring 4.

In the same manner as that of Example 1, a base coating film 2 is formed on a glass substrate 1. Also, in the present embodiment, the base coating film 2 need not be inevitably provided. On the base coating film 2 are disposed gate bus wirings 3 and source bus wirings 4 in a lattice-like shape. Also, in the present embodiment, the gate bus wiring 3 is composed of Ta, the source bus wiring 4 being composed of Ti. A base insulating film 11 is interposed in the intersection between the respective gate bus wirings 3 and the source bus wirings 4. At each rectangular area surrounded with the gate bus wiring 3 and source bus wiring 4 is provided a picture element electrode 5 that is composed of a transparent conductive film ITO, resulting in picture elements in a matrix. A TFT 6 is disposed in the vicinity of one corner of each picture element electrode 5 so that the drain electrode of TFT 6 and picture element electrode 5 are electrically connected to each other, a spare TFT 7 being disposed in the vicinity of another corner of the picture element electrode 5. In the present embodiment, the spare TFT 7 and picture element electrode 5 are electrically connected by means of the drain electrode 16, the TFT 6 and spare TFT 7 being juxtaposed on the gate bus wiring 3, the source electrode of TFT 6 and source bus wiring 4 being connected by means of a branch wire 8, a source electrode 15 of spare TFT 7 being guided to a connection 28 by an extension end 8a of source electrode, and the extension end 8a of source electrode at the connection 28 being disposed opposite to the branch wire 8 in a not-conductive state. Accordingly, only the TFT 6 among the two TFTs 6 and 7 is electrically connected to the source bus wiring 4, the spare TFT 7 being not connected thereto. The sectional view of TFT 6 taken on the line P—P in FIG. 8 is the same as FIG. 1B and also that of TFT 7 is the same as TFT 6.

FIG. 9 is a sectional view of the connection 28 taken on the line Q—Q in FIG. 8. In FIG. 9, on a base coating film 2 is formed each joint metal layer 24, which is rectangular when viewed at the plane as shown in FIG. 8, and composed of Ta the same as the gate bus wiring 3 so as to be patterned simultaneously with the formation of the gate bus wiring 3. On the joint metal layer 24 is deposited the aforesaid base insulating film 11, on which are disposed an extension end 8a of source electrode connected to the source electrode 15 of spare TFT 7 and a branch wire 8 connected to the source bus wiring 4, and the extension end 8a of source electrode and branch wire 8 are apart from each other and kept in a not-conductive state. Accordingly, each spare TFT 7 is not electrically connected with the corresponding source bus wiring 4. The extension end 8a of source electrode and the branch wire 8 are completely covered with a protective coat 17.

The base insulating film 11 positioned between the joint metal layer 24 and the extension end 8a of source electrode and branch wire 8 functions also as an interlayer insulating film between these metal layers and the wirings. In the present embodiment, the base insulating film 11 is set to be 2000 Å to 3500 Å in thickness.

The protective coat 17 is provided for performing, the electrical connection between the branch wire 8 and the extension 8a of source electrode in a state of being isolated from the liquid crystal layer 18 of a display medium. In the present embodiment, the protective coat 17 is set to be about 5000 Å in thickness.

A drive voltage is applied to all the picture element electrodes 5 from all the wirings of gate bus wiring 3 and source bus wiring 4 at the liquid crystal display apparatus of the above-mentioned construction, thereby driving the entire display apparatus. In a state that the display apparatus is driven in this way, it is easy to visually detect the picture element defect caused by a malfunction of TFT 6, and the picture element defect caused thereby is easy to be corrected by the use of the connection 28. Referring to FIG. 10, the connection 28 used for correcting the picture element defect is shown in section. As shown by the arrows 26 in FIG. 10, the energy, such as laser light, infrared ray, or electron beam, is irradiated from the outside thereof to a superposed portion of the joint metal layer 24, the branch wire 8 and the extension end 8a of source electrode. The present embodiment uses an YAG laser light. When the superposed portion of the branch wire 8, the base insulating film 11 and the joint metal layer 24 is irradiated with the laser light, the base insulating film 11 causes insulation breakdown so that the branch wire 8 and joint metal layer 24 are melted to be connected with each other so as to be in an electrically conductive state. In the same way, at the superposed portion of the extension end 8a of source electrode, the base insulating film 11 and the joint metal layer 24, the base insulating film 11 also causes insulation breakdown, whereby the extension end 8a and joint metal layer 24 are melted to be connected with each other so as to be in an electrically conductive state. Thus, the branch wire 8 and the extension end 8a of source electrode are electrically connected by the joint metal layer 24, so that the spare TFT 7 is driven by the source bus wiring 4. In the present embodiment, the laser light is irradiated from the glass substrate 1 side, but it is apparent that the laser light may be irradiated from any substrate side when it transmits the same.

Even when the laser light is used to correct the picture element defect, since the protective coat 17 is formed above the connection 28, the melted metal does not mix into the liquid crystal 18 of a display medium, and the protective coat 17 of a transparent insulator allows the laser light to pass therethrough. Accordingly, there is no fear that the protective coat 17 will be broken by the laser light. The liquid crystal layer irradiated by the laser light becomes cloudy, but is soon restored to the original state, thereby not causing any lowering of image quality.

In a case where the TFT 6 must be disconnected from the picture element electrode 5 due to the insulation breakdown of TFT 6, in the same manner as the above-mentioned, the laser light is irradiated to part of the drain electrode at TFT 6, thereby cutting the part. The TFT 6 and picture element electrode 5 are cut off from each other to thereby normally drive the picture element electrode 5 by the spare TFT 7.

The connection 28 may be constructed as shown in FIG. 11 or 12 other than that in FIG. 9. In FIG. 11, a through hole 27 is provided at a base insulating film 11, and a joint metal layer 24 and an extension end 8a of source electrode are previously electrically connected with each other. The picture element defect due to a malfunction of TFT 6 can easily be corrected by irradiating the optical energy only to the superposed portion of the branch wire 8 and the joint metal layer 24. In the construction shown in FIG. 12, the joint metal layer 24 is not provided, but the extension end 8a of source electrode is disposed right above the branch wire 8 so as to sandwich a portion of the base insulating film 11 therebetween. When a malfunction is caused in TFT 6, the optical energy is irradiated to melt and directly connect the extension end 8a of source electrode and the branch wire 8 with each other.

In FIG. 11, the through hole 27 may alternatively be provided at the branch wire 8 side, and the branch wire 8 and the joint metal layer 24 may previously be connected, in which the irradiation of laser light connects the extension end 8a of source electrode and the joint metal layer 24 only at the superposed portion thereof. Also, in FIG. 12, the branch wire 8 may alternatively be formed on the extension end 8a of source electrode so as to sandwich a portion of the base insulating film 11 therebetween.

Thus, the present embodiment of the active matrix display apparatus of the invention can reliably correct the picture element defect in a state where the defective portion of picture element can visually be specified with ease, thereby facilitating the inspection process and restoration process and ensuring mass productivity.

EXAMPLE 4

FIG. 13 is a plan view of an active matrix substrate used for still another embodiment of the invention. In the present embodiment, a TFT 6 and a spare TFT 7 are positioned reversely to the FIG. 8 embodiment, and each connection 28 is provided between gate bus wiring 3 and a branch wire 8. In the same manner as the embodiment of FIG. 8, each source bus wiring 4 is formed perpendicularly to a gate bus wiring 3, and each picture element electrode 5 comprising a transparent electrode ITO is provided at a rectangular area surrounded with the gate bus wiring 3 and source bus wiring 4. The TFT 6 and the spare TFT 7 are disposed in the vicinity of two corners of each picture element electrode 5, so that the TFT 6, the spare TFT 7 and the picture element electrode 5 are electrically connected by each drain electrode, the TFT 6 and spare TFT 7 being constructed in the same manner as that of FIG. 1B. The TFT 6 and spare TFT 7 are juxtaposed on each gate bus wiring 3, the TFT 6 being connected with each source bus wiring 4 by means of the branch wire 8. A source electrode 15 at each spare TFT 7 is guided by the extension end 8a of source electrode to a connection 28. The extension end 8a of source electrode at the connection 28 is opposite to the branch wire 8 in a not-conductive state. Accordingly, only the TFT 6 amount the TFT 6 and spare TFT 7 is electrically connected to each source bus wiring 4, the spare TFT 7 being not connected to each source bus wiring 4. The sectional view taken on the line Q'—Q' in FIG. 13 is the same as FIG. 9.

In the present embodiment, in the same manner as the FIG. 8 embodiment, the laser light or the like is irradiated onto the connection 28, whereby the picture element defect caused by a malfunction of TFT 6 can be corrected.

The above-mentioned Examples 1 through 4 show the transmission type liquid crystal display apparatus, but the present invention is, of course, applicable to a reflection type display apparatus. Also, in the Examples 1 through 4, the active matrix type liquid crystal display apparatus using the TFT is described, but the present invention is applicable to a wide-range display apparatus using various function elements, such as a metal-insulator-metal (MIM) element, a diode, and a varistor, and further to various display apparatus using thin film light mission layers, distributed electro-luminance layers, and a plasma luminosity.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display apparatus comprising a pair of substrates, at least one of which is translucent, a display medium charged between said substrates and modulated of its optical characteristics in response to applied voltage, picture element electrodes disposed in a matrix at the inner surface of either one of said pair of substrates, thin film transistors electrically connected to said picture element electrodes respectively, and spare thin film transistors disposed close to said picture element electrodes in a non-conductive state respectively, wherein an extension end of a drain electrode of each of said spare thin film transistors and each of said picture element electrodes are opposite each other in a non-conductive state so as to form a connection that is coated by an insulating protective coat and isolated from said display medium.

2. An active matrix display apparatus according to claim 1, wherein said connection is formed so that the extension end of said drain electrode of said spare thin film transistor and one end of said picture element electrode are disposed on a metal piece so as to sandwich an insulating layer therebetween.

3. An active matrix display apparatus according to claim 2, wherein a through hole is formed in a portion of said insulating film on which the extension end of said drain electrode of said spare switching element is disposed.

4. An active matrix display apparatus according to claim 2, wherein a through hole is formed in a portion of said insulating film on which the end of said picture element electrode is disposed.

5. An active matrix display apparatus according to claim 1, wherein said connection is formed so that the extension end of said drain electrode of said spare thin film transistor and one end of said picture element electrode are disposed so as to sandwich an insulating layer therebetween.

6. An active matrix display apparatus according to claim 1, wherein a cutout is formed near part of said picture element electrode to be connected with said thin film transistor.

7. An active matrix display apparatus comprising a pair of substrates, at least one of which is translucent, a display medium charged between said substrates and modulated of its optical characteristics in response to applied voltage, picture element electrodes disposed in a matrix at the inner surface of either one of said pair of substrates, thin film transistors and spare thin film transistors electrically connected to said picture element electrodes respectively, and signal lines connected to said thin film transistors respectively, wherein a connection at which an extension end of a source electrode of each of said spare thin film transistors and a branch wire branched from each of said signal lines are opposite each other so as to form a connection that is coated by a protective coat and isolated from said display medium.

8. An active matrix display apparatus according to claim 7, wherein said connection is formed so that the extension end of said drain electrode of said spare thin film transistor and one end of said picture element electrode are disposed on a metal piece so as to sandwich an insulating layer therebetween.

9. An active matrix display apparatus according to claim 8, wherein a through hole is formed in a portion of said insulating film on which the extension end of said drain electrode of said spare thin film transistor is disposed.

10. An active matrix display apparatus according to claim 8, wherein a through hole is formed in a portion of said insulating film on which the end of said picture element electrode is disposed.

11. An active matrix display apparatus according to claim 7, wherein said connection is formed so that the extension end of said drain electrode of said spare thin film transistor and one end of said picture element electrode are disposed so as to sandwich an insulating layer therebetween.

* * * * *